United States Patent [19]

Kellner et al.

[11] Patent Number: 4,638,902
[45] Date of Patent: Jan. 27, 1987

[54] MECHANISM FOR AUTOMATICALLY POSITIONING CLAMPING FRAMES

[75] Inventors: Roman Kellner, Bostetten; Georg Mayr, Friedberg; Karl-Heinz Proksch; Franz Pöckl, both of Augsburg, all of Fed. Rep. of Germany

[73] Assignee: KUKA Schweissanlagen Roboter GmbH, Fed. Rep. of Germany

[21] Appl. No.: 722,779

[22] Filed: Apr. 12, 1985

[30] Foreign Application Priority Data

Apr. 16, 1984 [DE] Fed. Rep. of Germany ....... 3414387

[51] Int. Cl.⁴ ............................................. B65G 47/00
[52] U.S. Cl. .................................................. 198/345
[58] Field of Search ................. 198/345, 470.1, 478.1, 198/473.1, 474.1, 802; 901/6, 7, 41, 42; 29/430, 429, 822, 823, 824, 559, 713, 714; 228/44.3; 269/37, 41, 43, 56

[56] References Cited

U.S. PATENT DOCUMENTS

| | | | |
|---|---|---|---|
| 1,182,293 | 5/1916 | Miller | 198/474.1 |
| 3,760,930 | 9/1973 | Reichert | 198/470.1 |
| 4,392,601 | 7/1983 | Fujikawa et al. | 29/430 X |

FOREIGN PATENT DOCUMENTS

| | | | |
|---|---|---|---|
| 2337970 | 2/1974 | Fed. Rep. of Germany | 198/470.1 |
| 3120218 | 12/1982 | Fed. Rep. of Germany | 228/44.3 |
| 54-113115 | 9/1979 | Japan | 228/44.3 |
| 57-58996 | 4/1982 | Japan | 228/44.3 |

OTHER PUBLICATIONS

Machine Design, "Robots are Key to K-CAR Quality", Sep. 1980, pp. 39-41.

Primary Examiner—Joseph E. Valenza
Assistant Examiner—D. Glenn Dayoan
Attorney, Agent, or Firm—McGlew and Tuttle

[57] ABSTRACT

Workpieces of unequal configuration are to be treated within an assembly line. For this purpose, suitable clamping frames are provided to hold the workpieces. These are moved about a common axis which extends laterally above an assembly line direction. While the upper edge of each individual clamping frame is hinged to an element which is rotatable about the axis, the lower edge is guided in a fixed guideway toward a working position. A common guideway length of two fixed guideways is movable into the working position transversely to the assembly line direction.

12 Claims, 4 Drawing Figures

MECHANISM FOR AUTOMATICALLY POSITIONING CLAMPING FRAMES

FIELD AND BACKGROUND OF THE INVENTION

The present invention relates in general to clamping frames for holding multipart workpieces together while they are assembled, particularly on an assembly line, and in particular to a new and useful mechanisms for holding workpieces of different configurations wherein a plurality of clamping frames can be brought individually from a standby position into a working position for holding the pieces of a workpiece together.

Such clamping frames are employed particularly in the assembly line manafacture of car bodies. They are used to receive and centrically clamp blank parts of the car body such as the sides, bottom and top, which are only temporarily held together and are mostly fed in along the assembly line, in order to make possible an automatic welding of the body.

It is known from German OS No. 28 10 822, to assemble and weld in a common assembly or transfer line, blank car bodies of two different designs. For this purpose, a corresponding set of clamping frames is provided for either of the designs, which is then brought into working position by means of a programmed control. The other set of frames which is not employed in the operation, must remain in a standby position so as not to hinder assembly operations.

In this prior art method, the standby positions are provided ahead of and behind the working position, considered in the transfer line direction. This has the disadvantage that consecutive working positions must be spaced from each other by at least the length of the set of clamping frames. In comparison with rigidly connected transfer lines, which, on the other hand, of course, allow an assemblage of bodies of uniform design only, such an arrangement requires much more space.

SUMMARY OF THE INVENTION

The present invention is directed to a mechanism of the above mentioned kind which provides, in a single working station, two or more clamping frames for a corresponding number of different designs of the work assembly, without thereby unfavorably affecting the spacing between two consecutive working stations, with the sought purpose being to be able to adjust the time during which a clamping frame moves from its standby position into its working position, and vice versa, to the predetermined cycle of the assembly line.

Accordingly, an object of the present invention is to provide a mechanism for holding workpieces of different configurations which comprises a plurality of clamping frames each for engaging the workpiece having a different configuration and each having a first end and a second end, rotary motion means rotatably connected to the first end of each frame for rotating all of the first ends about a common axis, the first ends being mutually spaced from each other and all being spaced from the common axis, and fixed guideway means spaced from the common axis and having at least one guideway for sequentially engaging each of the second ends, one at a time, with rotation of the first ends about the common axis, for sequentially bringing each frame from a standby position into a working position for engaging a workpiece.

This involves the basic idea of providing the standby position of each individual clamping frame at a selected location around a common center of rotation, and connecting it to the working position by means of fixed guideways. The region of the standby positions may be provided both laterally and either above or below the working position.

This has the advantage that the standby position has no impact on the length of the assembly or transfer line, and that the individual clamping frames can be displaced between their standby and working positions along a short path thus easily meeting the cycle rate of the assembly line.

It has been found further advantageous to provide the common axis of rotary motion for the clamping frames to be parallel to the direction of the assembly or transfer line and laterally thereof, with the fixed guideways extending laterally of the transfer line.

The same purpose, of course, would be served by providing the standby positions below the working position.

One preferred embodiment of the invention which is particularly useful for holding together the sides, top and bottom of an automobile body to be welded together, comprises a pair of vertical posts provided on either side of an assembly line, the posts carrying the fixed guideway means and rotatably supporting the rotary motion means which may be in the form of a disc connected to the first end of each frame. For a particularly compact structure, where plural fixed guideways are provided for the second end of each frame, the plural guideways end at a common guideway portion which portion is displaceable transversely to the assembly line direction for bringing the second end of each frame into its working position.

The handling mechanisms or manipulators needed in the working station are mounted preferably between each pair of posts. Since the clamping frames are large, the arms of the manipulators can readily work through the openings within the frames.

With three or more inventive clamping frames in a unit, the problem arises of preventing collisions between a frame moving from the standby into the working position and one moving out of the working position. In this regard, the invention provides two fixed guideways for the clamping frames which extend to substantially form a V as viewed in the assembly line direction. One leg of the V is more remote from the assembly line than the other and may be curved convexly outwardly with respect to the assembly line. Due to this convexity, a clamping frame moving into a working position can avoid the other frames.

In general, it may be assumed that it will be satisfactory and in accordance with the invention, to hinge the clamping frame to levers which execute the rotary movement about the common axis. To prevent the clamping frames from swinging about the common axis during such movements, proper guides should be provided.

To achieve the purpose, it is better to hinge the clamping frames to discs which are mounted for rotation about the common axis and have adjacent fixed plates by which the fixed guideways are supported. In principle, the rotaty discs can be substituted by the inventive levers. There is a further advantage in providing the discs with curved guideways of their own, each having centers of curvatures at the hinge point for the first end of each frame, the second end of each frame being guided in a respective curved guideway while the frame is at some position away from its working position.

The individual disc then may be made large enough to receive both the hinge and the associated circular guideway of the same clamping frame, so that with a sufficient pivotal motion of the disc, the respective clamping frame in its standby position is fully guided by the disc. In accordance with the invention, this may even be provided for two clamping frames.

However, to move an individual clamping frame from the standby position again into the working position, the invention provides that the curved guideways on the disc have exit ends which meet an entrance end of the at least one fixed guideway at a certain position for each frame for the second end of each frame to pass from the curved guideway into the fixed guideway. This ensures a smooth transition of the clamping frame from a rest position determined by the disc alone, into a position in which one edge of the clamping frame is hinged to the disc while the other edge is already introduced into the fixed guideway.

In this connection, the problem arises to prevent the clamping frame close to the transfer line from protruding into the space through which the car body assembly is moved along the transfer line. The invention therefore provides the fixed guideway at the side of the assembly line direction with a transition surface which extends tangentially to the disc edge so that a second end of a frame leaving its curved guideway on the disc is guided along the transition element into the entry end of the fixed guideway. This transition element of course, ensures a guidance of the clamping frame about the car body.

According to another object of the invention, the present invention provides a mechanism for holding multipart workpieces of different configurations together, which includes a guide lever connected to the first end of each frame which engages, through an element such as a roller, the fixed guideway to control the pivotal movement of the clamping frame.

This or still other embodiments depend on whether it is desired to turn the discs or levers carrying the hinged clamping frames through 360°, or more, or less than this amount.

This problem does not arise with the provision of only two clamping frames of which one is in its standby position while the other is in the working position. With three or more clamping frames in a unit, however, it matters whether the disc or the levers to which the clamping frames are hinged are drivable in both directions or only in a single direction.

A still further object of the invention is to provide a mechanism for holding multipart workpieces together which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
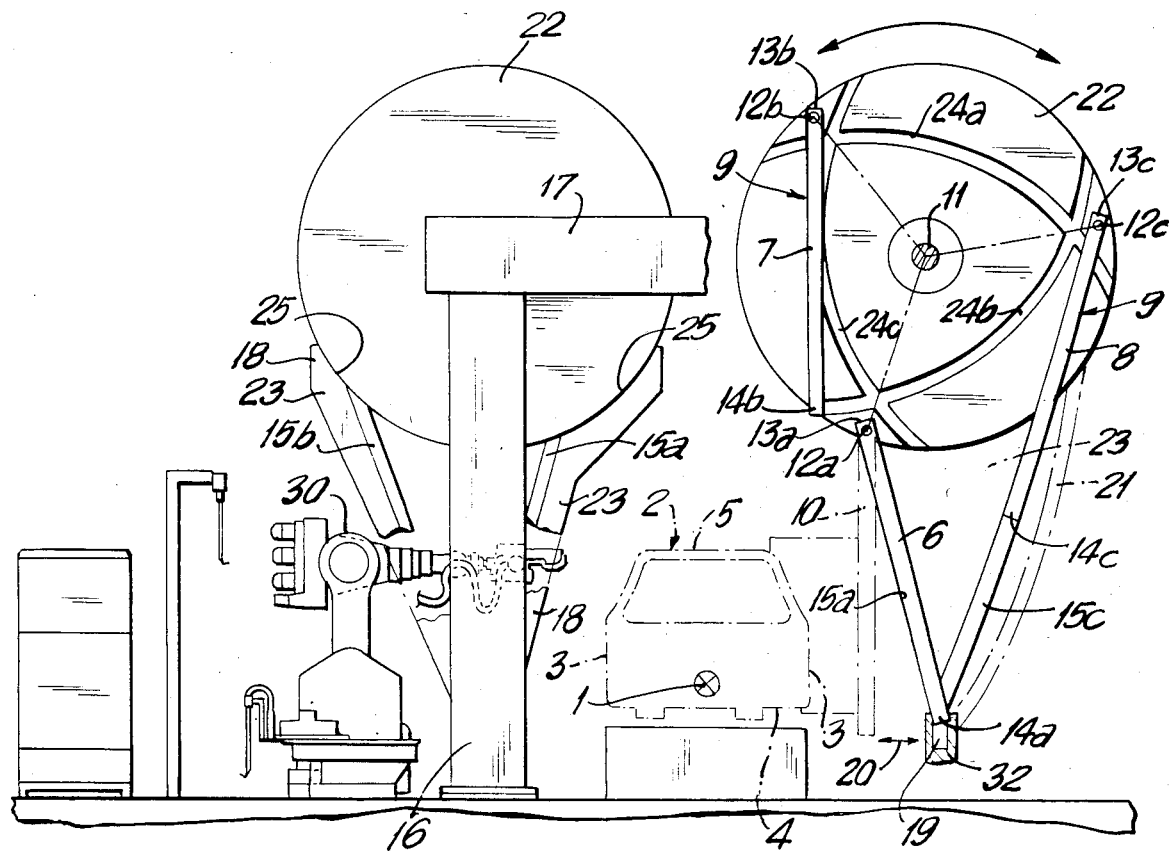
FIG. 1 is a partial sectional view of the invention taken through the transfer direction of an assembly line.

Referring to the drawings in particular, the invention embodied therein comprises a mechanism for holding multipart workpieces together which are of different configurations with each configuration being held by a different set of clamping frames.

FIG. 1 shows quite generally an assembly line axis 1 for manufacturing car bodies, along which a work assembly 2 is movable. This work assembly or workpiece, in the present example, comprises a bottom part 4, and a top part 5.

It will be understood that the invention covers also other kinds of assembly, mounting, and connecting of constructional parts, for other purposes.

In the embodiment shown in FIG. 1, a plurality of clamping frames 6, 7 and 8 are provided at either side of transfer line 1, for receiving, centering, and clamping together the parts of the work assembly 2. It is assumed, for example, that the parts of the work assembly are to be welded together. As shown in FIG. 1, clamping frame 6 is just ready to be brought from an oblique intermediate position (shown in solid lines) into a working position 10, indicated in broken lines, where it is to take hold of some of the parts of work assembly 2. The other clamping frames 7,8 in the right hand part of FIG. 1 are in standby positions 9.

The individual clamping frames 6,7,8 are each associated with car bodies of different design. Always only that clamping frame is brought into its working position 10, which is associated with the respective design. Each frame 6,7, or 8 is equipped in known fashion (see German OS No. 28 10 822) with projections which engage and hold a part to be assembled.

All the clamping frames 6, 7,8 are mounted for rotary movement about a common axis 11. For this purpose, clamping frames 6,7, 8 are hinged by hinges 12a, 12b and 12c to discs 22 which are mounted for rotary motion about axis 11, or to suitable levers (not shown). Each clamping frame has an upper edge portion 13a, 13b, 13c and a lower edge portion 14a, 14b, 14c, respectively.

Figure 2:
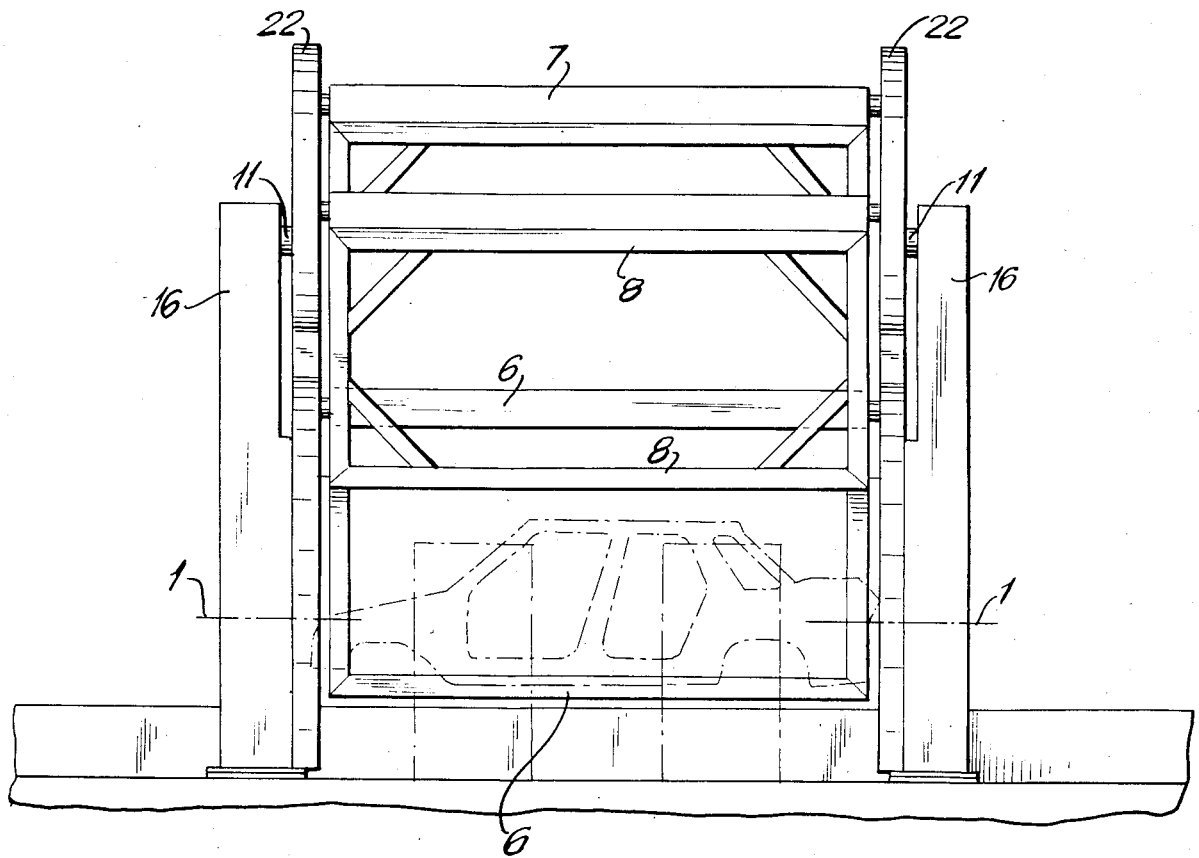
FIG. 2 is a side view of the device in FIG. 1.
Figure 3:
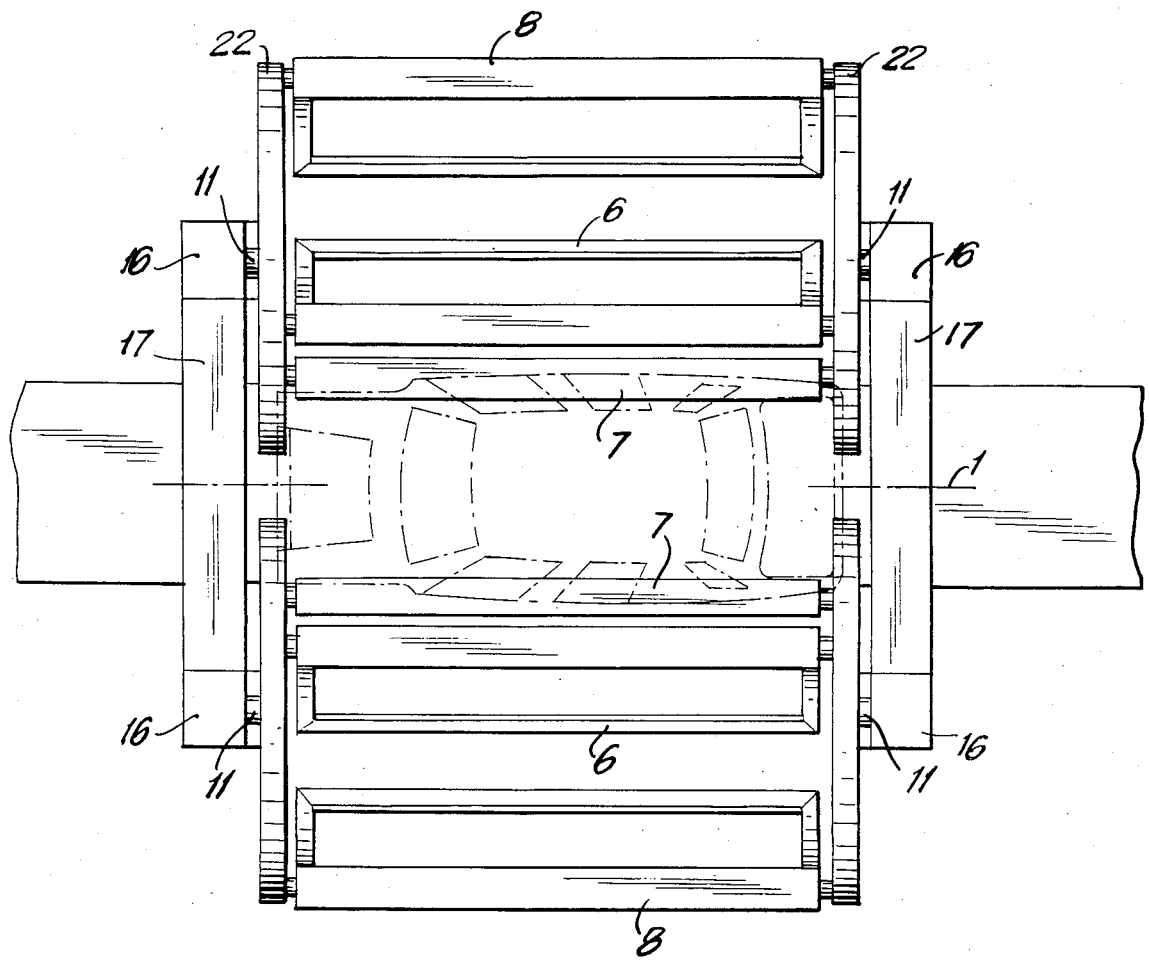
FIG. 3 is a top plan view of the device in FIG. 1.

In the embodiments of FIGS. 1, 2 and 3, the common axis embodied by shaft 11 is supported on pairs of posts 16, with one pair being provided at each side of transfer line 1. The two pairs of posts are connected together by respective cross members 17 and each carry one shaft 11 in their upper part. In their lower part, median and lower portions 18 of fixed guideways 15a, 15b and 15c are provided which are supported on fixed plates 23 mounted adjacent discs 22.

Below each fixed guideway 15a, 15b a preferably common guideway length 19 is provided into which the individual clamping frames 6,7,8 engage in their lowermost position by their lower edge portion 14a, 14b or 14c. This common guideway length 19 is provided in a member 32 which is movable in the direction of arrow 20, transversely to transfer line 1, to be able to bring the clamping frame, in the shown example, frame 6, into a vertical position 10 below the hinge 12a thereof. This vertical position 10 is indicated in broken lines and it is the working position of the frame in which the side part 3 of work assembly 2 will be clamped fast thereto and held in place. Any known means can be used to move guideway 19.

Further shown at the right hand side of FIG. 1 are clamping frames 7, 8 in standby positions 9. In the present example, disc 22 on which all the clamping frames 6,7,8 are mounted through hinges 12a 12b, 12c carries curved or circular guideways 24a, 24b, 24c whose centers of curvature coincide with the respective hinges 12a, 12b, 12c of the frames to be guided. The radii of these guideways 24a–24c correspond to the distance between the respective hinge 12a–12c and a guide element 14a–14c which is provided on the opposite, lower edge portion of this frame. In FIG. 1, for example, clamping frame 7 is shown in a position in which the lower end portion 14b can be guided only on the disc 22, in guideway 24b.

The other shown clamping frame 8 having its hinge 12c, of course, also on disc 22, is in a position in which its lower edge or guide portion 14c engages one of the fixed guideways 15c either on its way up or on its way down, depending on the instantaneous rotation of disc 22. With disc 22 turning clockwise, frame 6 is moved out of its working position 10 into a standby position such as shown for frame 7, while frame 8 is lowered to occupy the former position of frame 6. As the lower end of frame 6 rises to occupy the position shown for frame 7, its portion 14a enters one of the guideways 24a.

Should again frame 6 be put into working position instead of frame 8, it is better to rotate disc 22 counterclockwise, so that frame 6 (at is portion 14a) is lowered into the correct guideway 15a to be further pivoted into position 10, and frame 8 is moved up into a standby position.

Of course, there must be no collision between the frames moving into and out of the working position (see right hand part of FIG. 1). To prevent such a collision, the fixed guideway remote from transfer line 1 is made concavely arcuate, i.e. curved away from the transfer line as indicated at 21 in broken lines. With such a design, the just downwardly guided frame 8 moving from its standby position 9 into the working position 10, avoids collision with frame 6 moving at the same time from position 10 to position 9 of frame 7.

Since disc 22 is driven reversibly, a correct introduction of the lower edge portion 14a, 14b or 14c of a frame in standby position into the respective fixed guideway 15a, 15b or 15c must be ensured. More particularly, a frame in the standby position such as frame 7 moving downwardly must not collide with the work assembly in the transfer line. For this purpose, transition elements 25 having surfaces that are tangent to disc 22 and supported on fixed plates 23 are provided, against which the lower edge portion 14a, 14b or 14c of the frame abuts to slide toward the entrance of fixed guideway 15a, 15b or 15c (see the left side of FIG. 1).

The handling equipment (manipulators, robots, etc.) needed for welding the parts together are set up at the side remote from the transfer line 1 of the inventive mechanism. They can move or reach by their tools through the openings of a clamping frame such as 6 in working position 10, freely and easily. Robot arm 30 is shown in FIG. 1, for example.

Figure 4:
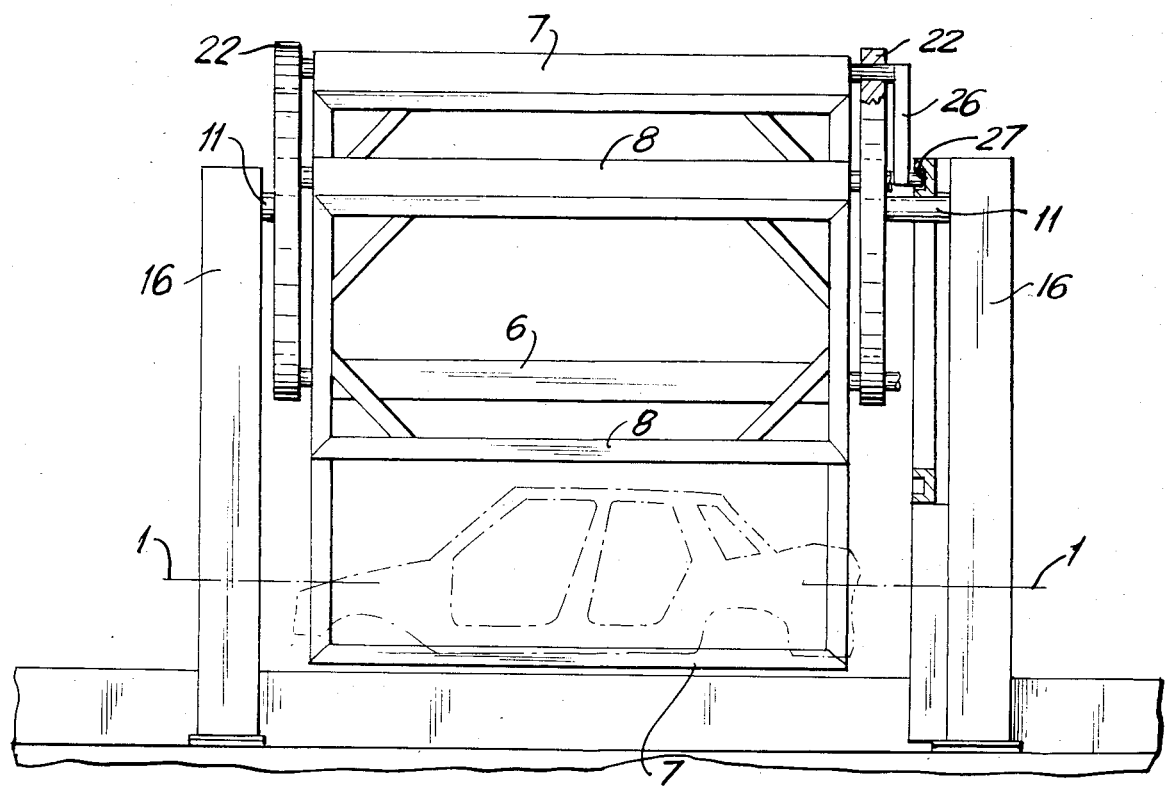
FIG. 4 is a side view corresponding to FIG. 2, of another embodiment of the invention.

FIG. 4 shows another embodiment for the guidance of the frames into and from their working positions. Instead of parts 18, 21 and 23, each clamping frame 6,7,8 has its hinges 12a, 12b or 12c non-rotatably connected to a guide lever 26 which engages through a guide element, such as a roller, into a fixed guideway 27. This fixed guideway 27 is of such design that it imparts to the respective clamping frame 6, 7, 8 an inclination and rotation as desired in the instantaneous position, while, of course, avoiding a collision with the common shaft 11. The opposite ends 14a, 14b, and 14c of the frames in FIGS. 1 to 3 need not be engaged in the embodiment of FIG. 4, therefore.

In this way, the angular position of each of the clamping frames 6,7,8 is controlled in any desired manner by the configuration or shape of the fixed guideway 27. Such a design makes it also possible to provide more than three clamping frames displaceable about a common axis 11.

While specific embodiments of the invention have been shown and described in detail to illustrate the application of the principles of the invention, it will be understood that the invention may be embodied otherwise without departing from such principles.

What is claimed is:

1. A mechanism for holding workpieces of different configurations, comprising:
 a plurality of clamping frames each for engaging a workpiece of different configuration and each having first and second spaced apart portions;
 rotary motion means rotatably connected to said first portion of each frame for rotating all of said first portions about a common axis, said first portions of said frames being mutually spaced from each other and spaced from said common axis, said rotary motion means comprising a fixed support and a disc rotatably mounted to said fixed support about said common axis, said common axis extending through a center of said disc, and said disc rotatably connected to said first portion of each frame at a location radially spaced from said common axis, said disc including a plurality of curved guideways each having a center of curvature at said first portion of one of said frames, each curved guideway having a radius corresponding to a distance between said first and second portion of each frame with said second portion of each frame being movable into a respective curved guideway when said frame is away from its working position; and
 at least one fixed plate mounted below said disc and having at least one fixed guideway for sequentially engaging said second portion of each frame, one at a time, with rotation of said first portions about said common axis, each frame being movable from a standby position to a working position with engagement of its second portion in said fixed guideway and movement of said second portion to a selected location on said guideway.

2. A mechanism according to claim 1, including assembly line means for moving workpieces in an assembly line passed said plurality of clamping frames in a transfer direction, said common axis extending parallel to said transfer direction and disposed laterally of said transfer direction.

3. A mechanism according to claim 2, wherein said common axis lies to a side of said transfer direction.

4. A mechanism according to claim 3, including a second plurality of clamping frames each for engaging a workpiece of different configuration and each corresponding to one of said first mentioned clamping frames for clamping a workpiece therebetween, second rotary motion means rotatably connected to said first portion of each second clamping frame for rotation about a common axis, and second fixed guideway means spaced from said common axis and having at least one guideway for sequentially engaging each second portion of each of said second frames, said second plurality of clamping frames, second rotary motion means and second fixed guideway means being disposed on a side of said transfer direction opposite from said first mentioned plurality of clamping frames, rotary motion means and fixed guideway means.

5. A mechanism according to claim 1, wherein with rotation of said disc, an exit end of each curved guideway is brought into alignment with an entry end of said at least one fixed guideway for transferring a second portion of a frame in said curved guideway to said at least one fixed guideway.

6. A mechanism according to claim 5, including a transition element having a surface extending tangentially to an outer edge of said disc, said curved guideway in said disc having opposite open ends extending to said edge of said disc, said transition element surface being positioned to guide a second end of each frame therealong from an end of a curved guideway into said at least one fixed guideway.

7. A mechanism according to claim 1, including a lever fixed to each frame and connected to said first portion of each frame, said lever carrying said second portion of each frame, a roller connected to said second portion of each frame engageable in said at least one guideway for rotation of a respective frame about its first portion with said roller moving in said fixed guideway.

8. A mechanism for holding workpieces of different configurations, comprising:
a plurality of clamping frames each for engaging a workpiece of different configuration and each having first and second spaced apart portions;
rotary motion means rotatably connected to said first portion of each frame for rotating all of said first portions about a common axis, said first portions of said frames being mutually spaced from each other and spaced from said common axis; and
fixed guideway means spaced from said common axis and having at least one fixed guideway for sequentially engaging said second portion of each frame, one at a time, with rotation of said first portions about said common axis, each frame being movable from a standby position to a working position with engagement of its second portion in said guideway and movement of said second portion into a selected location on said guideway;
said first portion of each frame being at a top end of each frame and said second portion of each frame being at a bottom end of each frame respectively, said rotary motion means comprising a disc mounted for rotation about said common axis, said first end of each frame being rotatably mounted at a point on said disc spaced radially from said common axis, said disc including a curved movable guideways each having a center of curvature at said first portion of each frame respectively, said second portion of each frame being movable into a respective curved guideway when the frame is away from its working positon, each curved guideway having entry and exit ends at an outer edge of said disc, said disc being movable into locations for bridging entry and exit ends of said curved guideways into a position near an entry end of said at least one fixed guideway for movement of a second portion of a frame between said curved and fixed guideways.

9. A mechanism according to claim 8 including assembly line means for moving workpieces along a transfer line, said common axis being parallel to and spaced laterally of said transfer line, said fixed guideway means including a second guideway intersecting with said first mentioned guideway at a location remote from said common axis with respect to entry ends of said first mentioned and second guideways.

10. A mechanism according to claim 9, wherein said fixed guideway means includes a common movable guideway portion carrying a movable guideway which is movable from a point of intersection of said first mentioned second guideways, transversely to said transfer line toward and away from said transfer line from bridging a lower second portion of each frame into a working position for each frame with its first upper portion directly above its second lower portion.

11. A mechanism according to claim 10, wherein said second fixed guideway is further away from said transfer line than said first mentioned guideway, said second guideway being curved concavely outwardly with respect to said transfer line for avoiding collisions between said frames.

12. A mechanism according to claim 11, wherein said fixed guideway means comprises a plate having said first mentioned and second guideways thereon and carrying said common movable guideway, said plate having an upper transfer surface extending tangentially to said outer edge of said disc for conveying said second portion of each frame from an exit end of each curved movable guideway into an entry end of one of said first mentioned and second fixed guideways.

* * * * *